United States Patent

Bell

(10) Patent No.: US 9,231,331 B2
(45) Date of Patent: Jan. 5, 2016

(54) CONNECTOR IDENTIFICATION THROUGH PROXIMITY SENSING

(71) Applicant: Intel Corporation, Santa Clara, CA (US)

(72) Inventor: Dennis Bell, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 215 days.

(21) Appl. No.: 13/931,546

(22) Filed: Jun. 28, 2013

(65) Prior Publication Data

US 2015/0002296 A1  Jan. 1, 2015

(51) Int. Cl.
*G08B 13/12* (2006.01)
*G08B 13/14* (2006.01)
*H01R 13/46* (2006.01)
*G06F 1/16* (2006.01)
*H01R 13/639* (2006.01)
*H04B 5/02* (2006.01)

(52) U.S. Cl.
CPC ............ *H01R 13/465* (2013.01); *G06F 1/1632* (2013.01); *H01R 13/6397* (2013.01); *H01R 2201/06* (2013.01); *H01R 2201/24* (2013.01); *H04B 5/02* (2013.01)

(58) Field of Classification Search
None
See application file for complete search history.

(56) References Cited

U.S. PATENT DOCUMENTS

| | | | |
|---|---|---|---|
| 6,680,852 B1 * | 1/2004 | Wortman | 361/752 |
| 7,532,461 B2 * | 5/2009 | Krancher et al. | 361/679.41 |
| 2007/0220187 A1 * | 9/2007 | Kates | 710/62 |
| 2014/0257046 A1 * | 9/2014 | Steven | 600/301 |

* cited by examiner

*Primary Examiner* — Travis Hunnings
(74) *Attorney, Agent, or Firm* — International IP Law Group, P.L.L.C.

(57) ABSTRACT

A computing device is disclosed herein. The computing device includes a connector port and a near field communication (NFC) transceiver/receiver to identify a connector approaching the connector port. The computing device also includes an indicator to indicate compatibility of the connector with the connector port.

28 Claims, 4 Drawing Sheets

400

CONNECTOR IDENTIFICATION THROUGH PROXIMITY SENSING

TECHNICAL FIELD

The present invention relates to connectors. In particular, the present invention relates to signaling the compatibility of a connector with a connector port.

BACKGROUND

Computing devices can include connector ports to connect the computing devices to other devices. Using the connector ports, a computing device can be connected to other electronic devices, such as a media device, a cellular phone, a display monitor, a memory device, a memory card reader or any other type of device. The computing device can also be connected to a power source via a connector port.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Embodiments disclosed herein provide techniques for signaling the compatibility of a connector with a connector port. A computing device can include a variety of connector ports. Current connectors and connector ports rely on a user orienting the connector properly and inserting the connector in a compatible port. However, as connectors become smaller for thinner computing devices, the type of connector and connector port becomes more difficult to identify correctly by visual inspection. When a connector is input into an incompatible connector port, the connector port can be damaged. In addition, connectors may be capable of more than one standard protocol. However, not all connector ports may be capable of additional standard protocols. Thus, plugging a connector into a connector port that is not capable of additional standard protocols can result in the connector not being used to its full potential.

A signal can be included with each connector port of a computing device. Using near field communication (NFC), an approaching connector can be identified and the compatibility of the connector with the connector port can be determined. The signal can be activated to signal the user of the compatibility of the connector with the connector port. By signaling the compatibility of the connector with the connector port to the user, rather than relying on the user's visual inspection, the risk of inserting an incompatible connector in a connector port and damaging the connector port can be reduced or eliminated.

Figure 1:
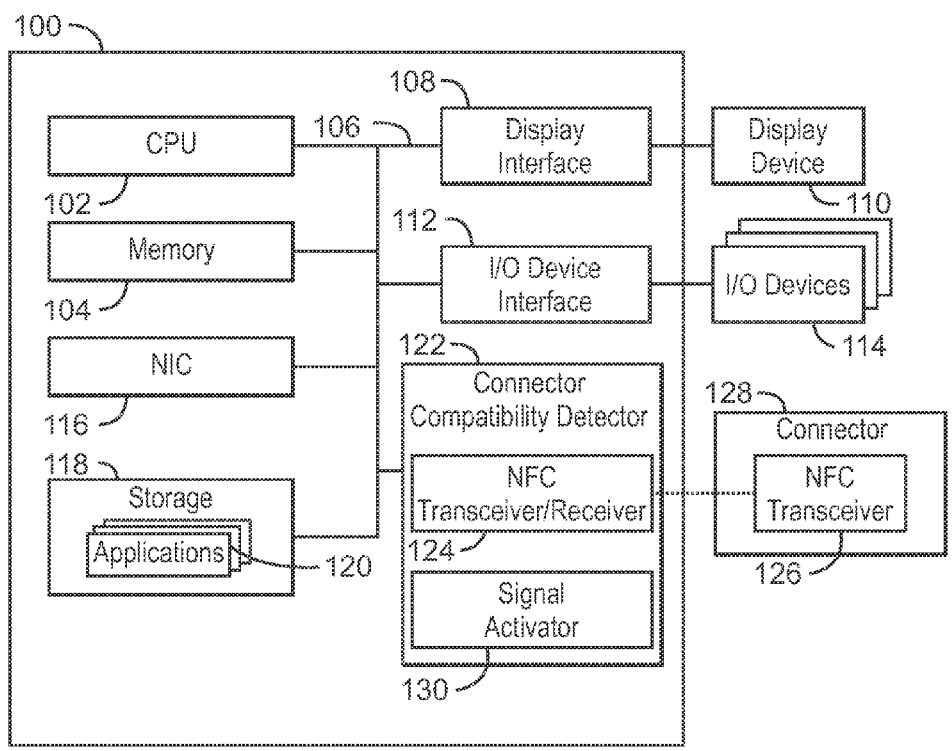
FIG. 1 is a block diagram of a computing device.

FIG. 1 is a block diagram of a computing device 100. The computing device 100 may be, for example, a laptop computer, tablet computer, mobile device, or cellular phone, such as a smartphone, among others. The computing device 100 can include a central processing unit (CPU) 102 that is configured to execute stored instructions, as well as a memory device 104 that stores instructions that are executable by the CPU 102. The CPU 102 can be coupled to the memory device 104 by a bus 106. Additionally, the CPU 102 can be a single core processor, a multi-core processor, or any number of other configurations. Furthermore, the computing device 100 can include more than one CPU 102.

The memory device 104 can include random access memory (RAM), read only memory (ROM), flash memory, or any other suitable memory systems. For example, the memory device 104 may include dynamic random access memory (DRAM). The CPU 102 can be linked through the bus 106 to a display interface 108 configured to connect the computing device 100 to a display device 110. The display device 110 can include a display screen that is a built-in component of the computing device 100. The display device 110 can also include a computer monitor, television, or projector, among others, that is externally connected to the computing device 100.

The CPU 102 can also be connected through the bus 106 to an input/output (I/O) device interface 112 configured to connect the computing device 100 to one or more I/O devices 114. The I/O devices 114 can include, for example, a keyboard and a pointing device, wherein the pointing device may include a touchpad or a touchscreen, among others. The I/O devices 114 can be built-in components of the computing device 100, or can be devices that are externally connected to the computing device 100.

A network interface card (NIC) 116 can be adapted to connect the computing device 100 through the system bus 106 to a network (not depicted). The network (not depicted) may be a wide area network (WAN), local area network (LAN), or the Internet, among others. In an example, the computing device 100 can connect to a network via a wired connection or a wireless connection.

The computing device 100 also includes a storage device 118. The storage device 118 is a physical memory such as a hard drive, an optical drive, a thumbdrive, a secure digital (SD) card, a microSD card, an array of drives, or any combinations thereof, among others. The storage device 118 can also include remote storage drives. The storage device 118 includes any number of applications 120 that are configured to run on the computing device 100.

The computing device 100 further includes a connector compatibility detector 122. The connector compatibility detector 122 includes a near field communication (NFC) transceiver/receiver 124. The near field communication (NFC) transceiver/receiver 124 can communicate with an NFC transceiver 126 on a connector 128. The connector 128 can connect an I/O device 114 to the computing device 100. The connector 128 can be any type of connector, such as a universal serial bus (USB) connector, high performance parallel interface (HIPPI), personal computer memory card international association card (PCMCIA card), controller area network (CAN bus), external serial advanced technology attachment (eSATA), IEEE 1394 interface (FireWire), ExpressCard, Fieldbus, small computer system interface (SCSI), serial attached SCSI (SAS), or any other type of connector.

By communicating with the NFC transceiver 126, the NFC transceiver/receiver 124 can detect the approach of the connector 128 to a connector port of the computing device 100. The NFC transceiver 126 informs the NFC transceiver/receiver 124 of the connector type and/or the protocol supported by the connector 128. If the connector type and/or the protocol supported by the connector 128 is compatible with a port on the computing device, a signal activator 130 can activate a signal to alert the user of the compatibility. In another example, the signal activator 130 can activate a signal to alert the user when the connector 128 is incompatible with the connector port. In a further example, the signal activator 130 can activate one signal when the connector 128 is compatible with the port and another signal when the connector 126 is incompatible with the port.

It is to be understood that while an NFC transceiver/receiver is described herein, any suitable type of sensor can be used to detect the approach of the connector 128 and the type of sensor is not limited to an NFC transceiver/receiver.

The block diagram of FIG. 1 is not intended to indicate that the 100 is to include all of the components shown in FIG. 1. Further, the computing device 100 may include any number of additional components not shown in FIG. 1, depending on the details of the specific implementation.

Figure 2:
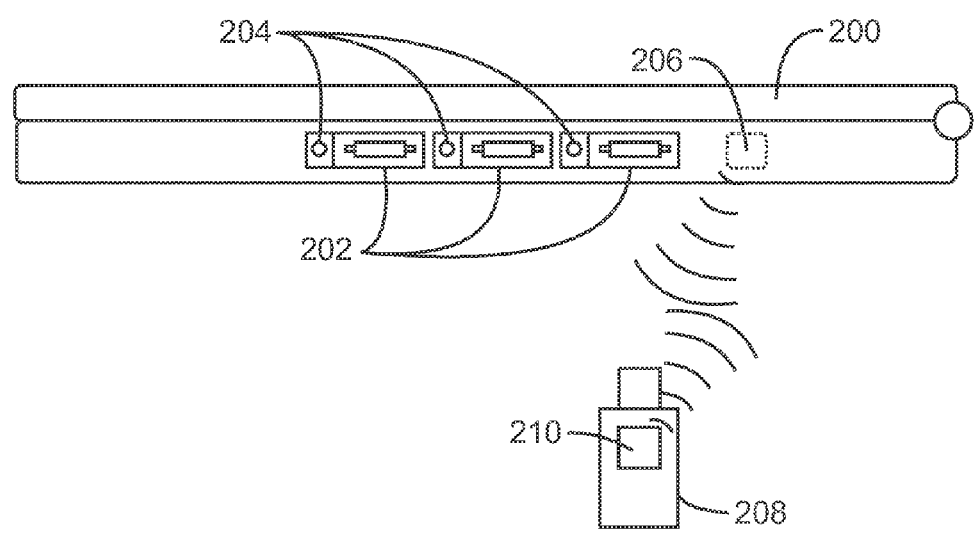
FIG. 2 is an illustration of an example of a connector and a computing device.

FIG. 2 is an illustration of an example of a computing device and a connector. The computing device 200 can be any type of computing device, such as a laptop computer, a desktop computer, a tablet computer, a cellular phone, or any other type of computing device. The computing device 200 includes a connector port 202. The connector port 202 can be any type of connector port, such as a USB port, a Display Port, a mini-USB port, a micro-USB port, or any other type of connector port. The computing device 200 can include multiple connector ports 202. The computing device 200 can include multiple connector ports 202 of the same type, or a variety of types of connector ports 202. For example, a computing device 200 can include multiple USB ports, an Ethernet connector port, and a micro-USB connector port.

The computing device 200 can also include a signal 204 near the connector port 202. The signal 204 can be any type of signal, such as a light signal or a sound signal. For example, the signal 204 can be an LED light. A signal 204 can be located near each connector port 202.

The computing device 200 also includes a near field communication (NFC) transceiver/receiver 206. The NFC transceiver/receiver 206 detects an approaching connector 208 by communicating with an NFC tag 210 on the connector 208. The NFC transceiver/receiver 206 can be a proximity transceiver, such as a low-power proximity transceiver. For example, the NFC transceiver/receiver 206 can communicate with the NFC tag 210 via a radio connection. For example, the NFC transceiver/receiver 206 can be a radio frequency identification (RFID) transceiver/receiver and the NFC tag 210 can be an RFID tag. The NFC tag 210 transmits information identifying the connector type to the NFC transceiver/receiver 206. The NFC tag 210 may also transmit additional information, such as the protocol supported by the connector 208. The NFC transceiver/receiver 206 uses the information to determine if the connector 208 is compatible with a connector port 202.

In an example, the NFC transceiver/receiver 206 can automatically communicate with the NFC tag 210. In another example, communication between the NFC transceiver/receiver 206 and the NFC tag 210 can be activated by a user, such as by pushing a button.

If the connector 208 is compatible with a connector port 202, the signal 204 near the connector port is activated. For example, the signal 204 can be a light that is activated when the connector 208 is compatible with the connector port 202. In another example, the signal 204 near the connector port can be activated when the connector 208 is not compatible with the connector port 202. In a further example, the signal 204 can include multiple lights, such as a red light and a green light. When the connector 208 is compatible with the connector port 202, the green light can be activated and when the connector 208 is incompatible with the connector port 202, the red light can be activated. While the lights are described here as green and red, the lights can be any color. In a further example, the signal 204 can be a sound, or any other type of signal.

In another example, the connector 208 can approach multiple connector ports 202 grouped together on a computing device 200. When the connector 208 approaches the grouping of connector ports 202, the NFC transceiver/receiver 206 can receive information from the NFC tag 210. If the connector 208 is compatible with a port in the grouping of connector ports 202, the signal 204 of the compatible port 202 can be activated. In another example, the signal 204 of the incompatible port(s) 202 can be activated when the connector 208 approaches the grouping of connector ports 202.

The connector 208 can act as a method of communication for the computing device 200. For example, the connector 208 can connect the computing device 200 to another device, such as a cellular phone, a display monitor, a network, a memory card reader, a memory storage device, or any other type of device. In another example, the connector 208 can connect the computing device to a power source, such as through a power charger.

The illustration of FIG. 2 is not intended to indicate that the computing device 200 and connector 208 is to include all of the components shown in FIG. 2. Further, the computing device 200 and connector 208 may include any number of additional components not shown in FIG. 2, depending on the details of the specific implementation.

Figure 3:
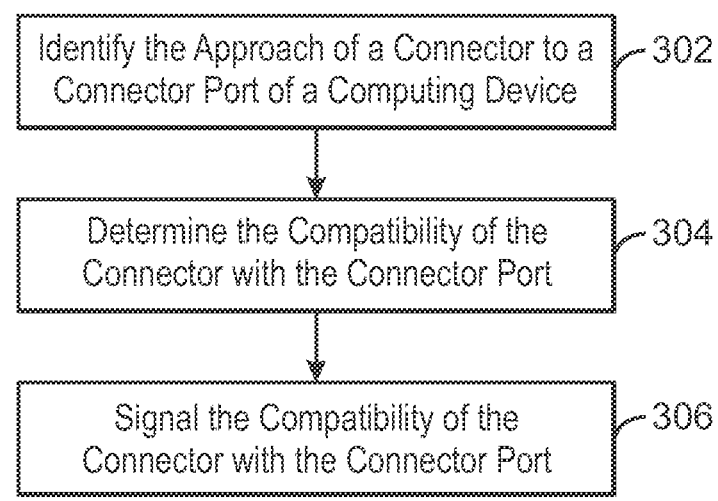
FIG. 3 is a process flow diagram of an example of a method of signaling connector compatibility with a connector port.

FIG. 3 is a process flow diagram of an example of a method 300 of signaling connector compatibility with a connector port. At block 302, the approach of a connector to a connector port of a computing device is identified. The approach can be identified by an NFC transceiver/receiver of the computing device. An NFC tag on the connector can provide the connector type, and any other type of information about the connector, to the NFC transceiver/receiver. For example, the NFC tag can also communicate the type of protocol supported by the connector.

At block 304, the compatibility of the connector with the connector port can be determined. In an example, the compatibility can be determined by the NFC transceiver/receiver. In another example, the NFC transceiver/receiver can be a simple device and compatibility can be determined by another part of the system, such as the processor. The information transmitted by the NFC tag can be used to determine compatibility. For example, the type of connector can be compared to the type of connector plug.

At block 306, the compatibility of the connector with the connector port can be signaled. A signal can be associated with each connector port on a computing device. The signal can be any type of signal, such as a light or a sound. In an example, the signal can be a low power signal. The signal can be activated when a compatible connector approaches the connector port. In another example, the signal can be activated when an incompatible connector approaches the connector port. In a further example, the signal can be a double signal, such as a red light and a green light. The green light can be activated when a compatible connector approaches the connector port and the red light can be activated when an incompatible connector approaches the connector port.

Figure 4:
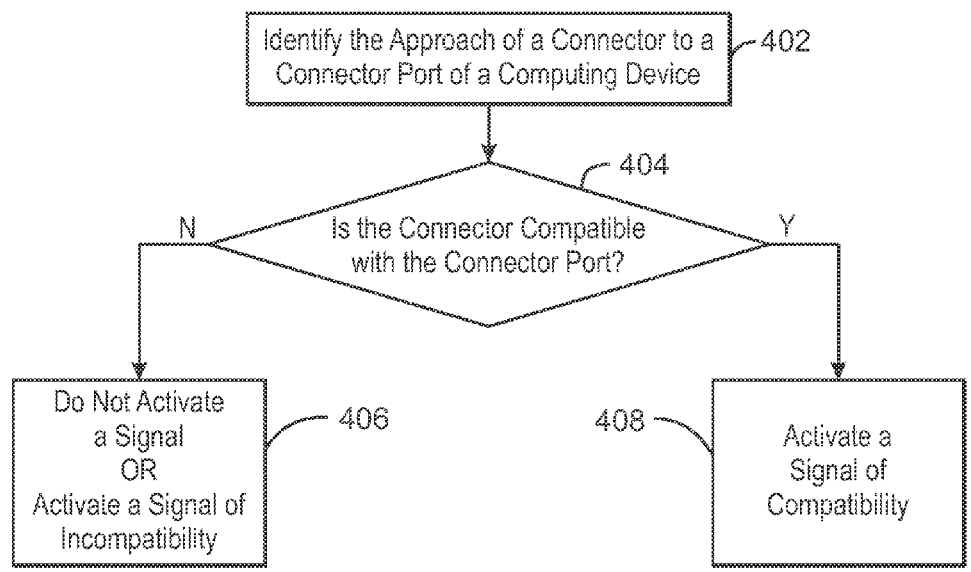
FIG. 4 is a process flow diagram of an example of a method of signaling connector compatibility with a connector port.

FIG. 4 is a process flow diagram of an example of a method 400 of signaling connector compatibility with a connector port. At block 402, the approach of a connector to a connector port of a computing device can be identified. The connector can include an NFC tag. An NFC transceiver/receiver of the computing device can detect the approaching NFC tag. The NFC tag can communicate information about the connector to the NFC transceiver/receiver. The information can include the type of connector, the protocol supported by the connector, and any other information about the connector.

At block 404, the NFC transceiver/receiver can determine if the connector is compatible with the connector port. The NFC transceiver/receiver can use the information transmitted by the NFC tag to determine if the connector is compatible with the connector port. If the connector is not compatible with the connector port, at block 406 no signal is activated or a signal of incompatibility is activated. For example, the signal of incompatibility can be a red light.

If the connector is compatible with the connector port, at block 408 a signal of compatibility is activated. The signal can be any type of signal, such as a light or a sound. For example, the signal can be a green light that is activated when the connector approaches a compatible connector port.

Example 1

A computing device is described herein. The computing device includes a connector port and a near field communication (NFC) transceiver/receiver to identify a connector approaching the connector port. The computing device also includes an indicator to indicate compatibility of the connector with the connector port.

The indicator can be activated when the connector is compatible with the connector port. The indicator can be activated when the connector is incompatible with the connector port. The indicator can be a two-part indicator wherein a first part of the indicator is activated when the connector is compatible with the connector port and a second part of the indicator is activated when the connector is incompatible with the connector port. The connector can be a universal serial bus (USB) and the connector port can be a USB port. The indicator can be a light, a sound, or a combination thereof. The computing device can include a plurality of connector ports, each port associated with an indicator, and wherein an indicator associated with a port compatible with the connector is activated when the connector approaches the plurality of connector ports. The connector port can include an NFC tag to communicate with the NFC transceiver/receiver.

Example 2

A method is described herein. The method includes identifying an approach of a connector to a connector port of a computing device. The method also includes determining compatibility of the connector with the connector port. The method further includes activating an indicator of the compatibility of the connector with the connector port.

The method can include activating the indicator when the connector is determined to be compatible with the connector port. The method can also include activating the indicator when the connector is determined to be incompatible with the connector port. The indicator can be a two-part indicator wherein a first part of the indicator is activated when the connector is determined to be incompatible with the connector port and a second part of the indicator is activated when the connector is determined to be compatible with the connector port. Identifying the approach of the connector can include receiving information from a near field communication (NFC) tag of the connector in an NFC transceiver/receiver of the computing device. The connector can be a universal serial bus (USB) and the connector port can be a USB port.

Example 3

A signaling system is described herein. The signaling system can include a computing device including a connector port, a near field communication (NFC) transceiver/receiver, and an indicator associated with the connector port. The signaling system can also include a connector including an NFC tag. The NFC transceiver/receiver receives information from the NFC tag to verify compatibility of the connector with the connector port when the connector approaches the connector port and wherein the indicator is activated to indicate the compatibility of the connector with the connector port.

The indicator can be activated when the connector is compatible with the connector port. The indicator can be activated when the connector is incompatible with the connector port. The indicator is a two-part indicator wherein a first part of the indicator is activated when the connector is incompatible with the connector port and a second part of the indicator is activated when the connector is compatible with the connector port. The connector can be a universal serial bus (USB) and the connector port can be a USB port.

Example 4

A computing device is described herein. The computing device includes a connector port and a sensor to identify a connector approaching the connector port. The computing device also includes an indicator to indicate compatibility of the connector with the connector port.

The indicator can be activated when the connector is compatible with the connector port. The indicator can be activated when the connector is incompatible with the connector port. The indicator can be a two-part indicator wherein a first part of the indicator is activated when the connector is compatible with the connector port and a second part of the indicator is activated when the connector is incompatible with the connector port. The connector can be a universal serial bus (USB) and the connector port can be a USB port. The indicator can be a light, a sound, or a combination thereof. The computing device can include a plurality of connector ports, each port associated with an indicator, and wherein an indicator associated with a port compatible with the connector is activated when the connector approaches the plurality of connector ports. The connector port can include tag to communicate with the sensor.

Some embodiments may be implemented in one or a combination of hardware, firmware, and software. Some embodiments may also be implemented as instructions stored on a machine-readable medium, which may be read and executed by a mobile platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing device, comprising:
   a connector port;
   a near field communication (NFC) transceiver/receiver to identify a connector approaching the connector port and to receive information identifying a connector type and a protocol supported by the connector; and
   an indicator to indicate compatibility of the connector with the connector port based on the connector type and the protocol supported by the connector.

2. The computing device of claim 1, wherein the indicator is activated when the connector is compatible with the connector port.

3. The computing device of claim 1, wherein the indicator is activated when the connector is incompatible with the connector port.

4. The computing device of claim 1, wherein the indicator is a two-part indicator and wherein a first part of the indicator is activated when the connector is compatible with the connector port and a second part of the indicator is activated when the connector is incompatible with the connector port.

5. The computing device of claim 1, wherein the connector is a universal serial bus (USB) and the connector port is a USB port.

6. The computing device of claim 1, wherein the indicator is a light, a sound, or a combination thereof.

7. The computing device of claim 1, wherein the computing device comprises a plurality of connector ports, each port associated with an indicator, and wherein an indicator associated with a port compatible with the connector is activated when the connector approaches the plurality of connector ports.

8. The computing device of claim 1, wherein the connector port comprises an NFC tag to communicate with the NFC transceiver/receiver.

9. A method, comprising:
   identifying an approach of a connector to a connector port of a computing device;
   determining compatibility of the connector with the connector port based on a connector type and a protocol supported by the connector; and
   activating an indicator of the compatibility of the connector with the connector port.

10. The method of claim 9, comprising activating the indicator when the connector is determined to be compatible with the connector port.

11. The method of claim 9, comprising activating the indicator when the connector is determined to be incompatible with the connector port.

12. The method of claim 9, wherein the indicator is a two-part indicator and wherein a first part of the indicator is activated when the connector is determined to be incompatible with the connector port and a second part of the indicator is activated when the connector is determined to be compatible with the connector port.

13. The method of claim 9, identifying the approach of the connector comprising receiving information from a near field communication (NFC) tag of the connector in an NFC transceiver/receiver of the computing device.

14. The method of claim 9, wherein the connector comprises a universal serial bus (USB) and the connector port comprises a USB port.

15. The method of claim 9, identifying the approach of the connector to the connector port of the computing device comprising sensing the approach of the connector to the connector port.

16. A signaling system, comprising:
   a computing device comprising:
      a connector port;
      a near field communication (NFC) transceiver/receiver; and
      an indicator associated with the connector port; and
   a connector comprising an NFC tag,
   wherein the NFC transceiver/receiver is to receive information identifying a connector type and a protocol supported by the connector from the NFC tag to verify compatibility of the connector with the connector port when the connector approaches the connector port and wherein the indicator is activated to indicate the compatibility of the connector with the connector port.

17. The computing device of claim 16, wherein the indicator is activated when the connector is compatible with the connector port.

18. The computing device of claim 16, wherein the indicator is activated when the connector is incompatible with the connector port.

19. The computing device of claim 16, wherein the indicator is a two-part indicator and wherein a first part of the indicator is activated when the connector is incompatible with the connector port and a second part of the indicator is activated when the connector is compatible with the connector port.

20. The computing device of claim 16, wherein the connector comprises a universal serial bus (USB) and the connector port comprises a USB port.

21. A computing device, comprising:
   a connector port;
   a sensor to identify a connector approaching the connector port; and
   an indicator to indicate compatibility of the connector with the connector port based on a connector type and a protocol supported by the connector.

22. The computing device of claim 21, wherein the indicator is activated when the connector is compatible with the connector port.

23. The computing device of claim 21, wherein the indicator is activated when the connector is incompatible with the connector port.

24. The computing device of claim 21, wherein the indicator is a two-part indicator and wherein a first part of the indicator is activated when the connector is compatible with the connector port and a second part of the indicator is activated when the connector is incompatible with the connector port.

25. The computing device of claim 21, wherein the connector is a universal serial bus (USB) and the connector port is a USB port.

26. The computing device of claim 21, wherein the indicator is a light, a sound, or a combination thereof.

27. The computing device of claim 21, wherein the computing device comprises a plurality of connector ports, each port associated with an indicator, and wherein an indicator associated with a port compatible with the connector is activated when the connector approaches the plurality of connector ports.

28. The computing device of claim 21, wherein the connector port comprises a tag to communicate with the sensor.

* * * * *